United States Patent [19]

Dhyanchand et al.

[11] Patent Number: 5,495,403
[45] Date of Patent: Feb. 27, 1996

[54] STEPPED-WAVEFORM POWER CONVERTER UTILIZING A SUMMING TRANSFORMER AND A SINGLE INVERTER BRIDGE

[75] Inventors: John Dhyanchand; Chai-Nam Ng; Vietson Nguyen; Richard Arbanella, all of Rockford, Ill.

[73] Assignee: Sundstrand Corporation, Rockford, Ill.

[21] Appl. No.: 363,136

[22] Filed: Dec. 24, 1994

[51] Int. Cl.⁶ .................................................. H02M 1/12
[52] U.S. Cl. ............................................................ 363/43
[58] Field of Search .................................. 363/37, 40, 43, 363/64, 65, 97, 98, 132, 126, 127; 322/10, 13, 28, 49; 336/12, 184, 212, 215

[56] References Cited

U.S. PATENT DOCUMENTS

| | | |
|---|---|---|
| 3,648,149 | 3/1972 | Brown et al. ................................. 321/5 |
| 4,063,144 | 12/1977 | Hucker et al. ............................. 363/43 |
| 4,276,589 | 6/1981 | Okawa et al. ............................. 363/71 |
| 4,968,926 | 11/1990 | Dhyanchand ............................. 322/10 |
| 5,177,460 | 1/1993 | Dhyanchand et al. .................... 363/43 |
| 5,225,973 | 7/1993 | Patel et al. ................................. 363/43 |
| 5,239,454 | 8/1993 | Dhyanchand ............................. 363/43 |
| 5,446,643 | 8/1995 | McMurray ................................. 363/40 |

Primary Examiner—Matthew V. Nguyen
Attorney, Agent, or Firm—Jeffery J. Makeever

[57] ABSTRACT

A summing transformer includes first and second sets of primary windings and first and second sets of secondary windings. The primary windings of the first set are connected in a wye configuration whereas the windings of the second set are connected in a delta configuration and the sets of primary windings are connected to form a wye-delta configuration having terminals coupled to the outputs of an inverter bridge. Each winding of the first set of secondary windings is interconnected with a winding of the second set of secondary windings. Circuitry is provided for operating the inverter bridge such that a stepped phase output waveform is produced at each of a plurality of phase outputs.

15 Claims, 5 Drawing Sheets

STEPPED-WAVEFORM POWER CONVERTER UTILIZING A SUMMING TRANSFORMER AND A SINGLE INVERTER BRIDGE

TECHNICAL FIELD

The present invention relates generally to power converters, and more particularly to a power converter which produces a stepped output waveform.

BACKGROUND ART

Inverters are often used in variable-speed, constant-frequency power generating systems to convert DC power produced by a brushless, synchronous generator and a rectifier bridge into AC power for energizing one more AC loads. A pulse-width modulated (PWM) inverter for producing three-phase AC power typically includes six controllable power switches connected in a bridge configuration. The switches are operated by PWM control waveforms to produce a set of three PWM output voltages at junctions between the power switches. The output voltages switch between three voltage levels, i.e. zero volts, a positive voltage and a negative voltage, to produce a PWM waveform having a substantial fundamental component and higher harmonic components. Regulation of the output power produced by the inverter can be effected by sensing a parameter of the output power and selecting PWM switch operating waveforms in dependence upon the sensed parameter to in turn cause a selected parameter to approach a regulated value.

Stepped waveform inverters utilize a plurality of subinverter bridges coupled to a summing transformer. In a specific type of stepped waveform inverter disclosed in Compoly, et al., U.S. Pat. No. 3,775,662, three-phase outputs off our subinverters are coupled to respective three-phase primary windings of a summing transformer. The windings of two of the sets of primary windings are connected in a wye configuration while the windings of the remaining sets of primary windings are connected in a delta configuration. The summing transformer further includes a set of three-phase secondary windings which are inductively coupled to the sets of primary windings. During operation, rectangular voltage waveforms are supplied to the primary windings by the subinverters to produce a set of three-phase summed output voltages in the secondary windings. The output voltages comprise 24-step waveforms having a substantial fundamental component and higher harmonic components.

Each of the PWM and stepped waveform inverters has advantages and disadvantages. The PWM inverter requires only six power switches to produce a usable high power output. As a result, a relatively simple control unit may be employed to operate the switches and cooling requirements are minimized. However, the PWM inverter generates harmonics of sufficient amplitude to require the use of a large and heavy filter. This filter undesirably increases the size and weight of the overall inverter system and may render the system unsuitable for certain applications where size and weight must be minimized, such as in aircraft.

In addition to the foregoing, the number of switch transitions per cycle is occasionally high enough to cause power dissipation to increase unacceptably. Further, the inverter occasionally operates in an unreliable fashion when the number of switch transitions per cycle becomes too high.

The stepped waveform inverter generates substantially lower magnitudes of harmonic content than the PWM inverter, and hence the filter size and weight are greatly reduced as compared therewith. Also, isolation between input and output is accomplished by the summing transformer and hence a separate isolation transformer is not required for those applications where isolation is needed. Further, EMI is reduced by the transformer. However, while the switches of the stepped waveform inverter can be lower power devices that are relatively inexpensive and readily available, a substantially greater number of power switches must be used as compared with the PWM inverter, and hence gate drive complexity and packaging requirements are increased. Further, the summing transformer size and weight are not negligible, in turn partially offsetting the decreased size and weight of the filter.

The stepped waveform inverter has the further disadvantage in that the same number of switches must be used regardless of the output power level produced thereby Klein, U.S. Pat. No. 3,979,662 discloses an inverter system wherein the outputs of first and second inverters are coupled by first and second transformers, respectively, to a common load. More specifically, three-phase outputs of the first inverter are coupled to a set of wye-connected three-phase primary windings of the first transformer. Similarly, three-phase outputs of the second inverter are coupled to a set of wye-connected three-phase windings of a second transformer. The first transformer includes a set of three-phase secondary windings whereas the second transformer includes a set of three-phase secondary windings and a set of three-phase tertiary windings. The phase A primary winding of the first transformer is connected by the phase B secondary winding of the first transformer, the phase A secondary winding of the second transformer and the phase C tertiary winding of the second transformer to phase A of the load. In like fashion, the phase B primary winding of the first transformer is connected by the phase C secondary winding of the first transformer, the phase B secondary winding of the second transformer and the phase A tertiary winding of the second transformer to phase B of the load. Further, the phase C primary winding of the first transformer is connected by the phase A secondary winding of the first transformer, the phase C secondary winding of the second transformer and the phase B tertiary winding of the second transformer to phase C of the load. The inverters are operated to produce pulse-width modulated waveforms which are vectorially added by the transformers to produce stepped waveforms having pulse-width modulated notches therein.

Paice, U.S. Pat. No. 4,698,739 discloses a motor drive wherein the outputs of first and second inverters are coupled to primary and secondary windings of a transformer. The inverters are operated to produce a stepped waveform in the inverter output.

An article entitled "Which DC/AC Inverter?" appearing in *Electronic Design,* Dec. 6, 1974, by George A. O'Sullivan discloses a 24-step waveform inverter similar to that disclosed in Compoly, et al.

Japanese patent publication 54-104537 to Isamu Hosono discloses an inverter having a pair of inverter bridges which are coupled to a summing transformer that in turn produces a two-phase AC output.

Brown, et al., U.S. Pat. No. 3,648,149 discloses a polyphase inverter circuit wherein a plurality of bridge commutated inverter networks are coupled in either a wye or a delta configuration to primary windings of a transformer.

Output waveforms are produced in secondary windings wherein the waveforms are free of third harmonic voltage components.

Hucker, et al., U.S. Pat. No. 4,063,144 (assigned to the assignee of the instant application) discloses an inverter that produces a composite output waveform wherein an alternating stepped waveform having three steps per half cycle is summed with a square wave in phase therewith and having a frequency three times greater than the alternating stepped waveform.

Okawa, et al., U.S. Pat. No. 4,276,589 discloses a 12-step current source inverter wherein a DC source is connected through smoothing reactors to first and second interphase transformers. First and second inverter bridges are coupled to outputs of the interphase transformers and the outputs of the inverter bridges are connected together and are further connected to a load.

SUMMARY OF THE INVENTION

In accordance with the present invention a power converter and summing transformer for use therewith converts DC power into stepped AC waveforms in a simple and inexpensive fashion.

More particularly, according to one aspect of the present invention, a summing transformer includes first and second sets of primary windings and first and second sets of secondary windings wherein the primary windings of the first set are connected in a phase-to-neutral configuration and the primary windings of the second set are connected in a phase-to-phase configuration and wherein terminals of the first set of primary windings are coupled to corresponding terminals of the second set of secondary windings. Each winding of the first set of secondary windings is inductively coupled to an associated winding of the first set of primary windings and is further coupled to a phase output and each winding of the second set of primary windings is inductively coupled to an associated winding of the second set of primary windings. Means are provided for interconnecting the first and second sets of secondary windings.

Preferably, the interconnecting means comprises a neutral forming transformer having phase windings coupled between the first and second sets of secondary windings. Also preferably, each set of primary windings and each set of secondary windings includes three phase windings.

Also in accordance with the preferred embodiment, the summing transformer is utilized with an inverter having phase outputs coupled to phase inputs of the summing transformer. The inverter preferably includes means for producing rectangular waveforms at the phase outputs thereof where the rectangular waveforms may or may not be pulse width modulated.

According to a further aspect of the present invention, a power converter includes an inverter bridge having a plurality of phase outputs and a summing transformer having first and second sets of primary windings each having a plurality of terminals coupled to the inverter bridge and first and second sets of secondary windings. The windings of the first set of primary windings are connected in a phase-to-neutral configuration and the windings of the second set of primary windings are connected in a phase-to-phase configuration wherein the terminals of the first set of primary windings are coupled to corresponding terminals of the second set of primary windings. Each winding of the first and second sets of secondary windings is inductively coupled to an associated winding of the first and second sets of primary windings, respectively, and each winding of the first set of secondary windings includes an end connected to a phase output. A neutral forming transformer is coupled to the windings of the first and second sets of secondary windings and means are provided for operating the inverter bridge such that a rectangular phase output waveform is produced at each phase output.

In accordance with yet another aspect of the present invention, a power converter includes a three-phase inverter bridge, a summing transformer having first and second sets of three-phase primary windings and first and second sets of three-phase secondary windings. Each set of primary windings includes three terminals coupled to the inverter bridge wherein the primary windings of the first set are connected in a wye configuration and the primary windings of the second set are connected in a delta configuration. Each winding of the first and second set of secondary windings is inductively coupled to an associated winding of the first and second set of primary windings, respectively. Each winding of the first set of secondary windings includes an end coupled to a phase output. A neutral forming transformer is coupled to the first and second sets of secondary windings. Means are provided for operating the inverter bridge such that a stepped phase output waveform is produced at each phase output.

Advantageously, the inverter and summing transformer of the present invention produces stepped output waveforms using only a single inverter bridge and associated controls. Thus, the advantages of a stepped waveform inverter are realized without a corresponding increase in complexity and expense. Further, the stepped output waveforms may be pulse-width modulated to reduce output filter size and weight.

DESCRIPTION OF THE PREFERRED EMBODIMENTS

Figure 1:
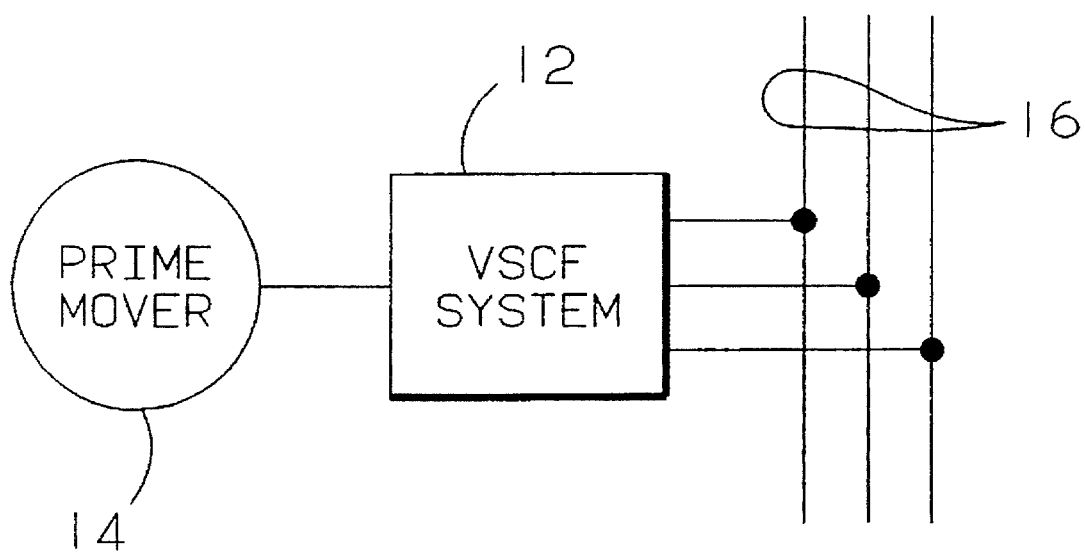
FIG. 1 is a block diagram of a prime mover in conjunction with a variable-speed constant-frequency (VSCF) power generating system.

Referring now to FIG. 1, a variable-speed, constant-frequency (VSCF) system 12 converts variable-speed motive power produced by a prime mover 14 into polyphase, constant-frequency AC electrical power which is in turn provided to a load bus 16. It should be noted that contactors interconnecting the VSCF system 12 with the load bus 16 are not shown for the sake of clarity.

Figure 2:
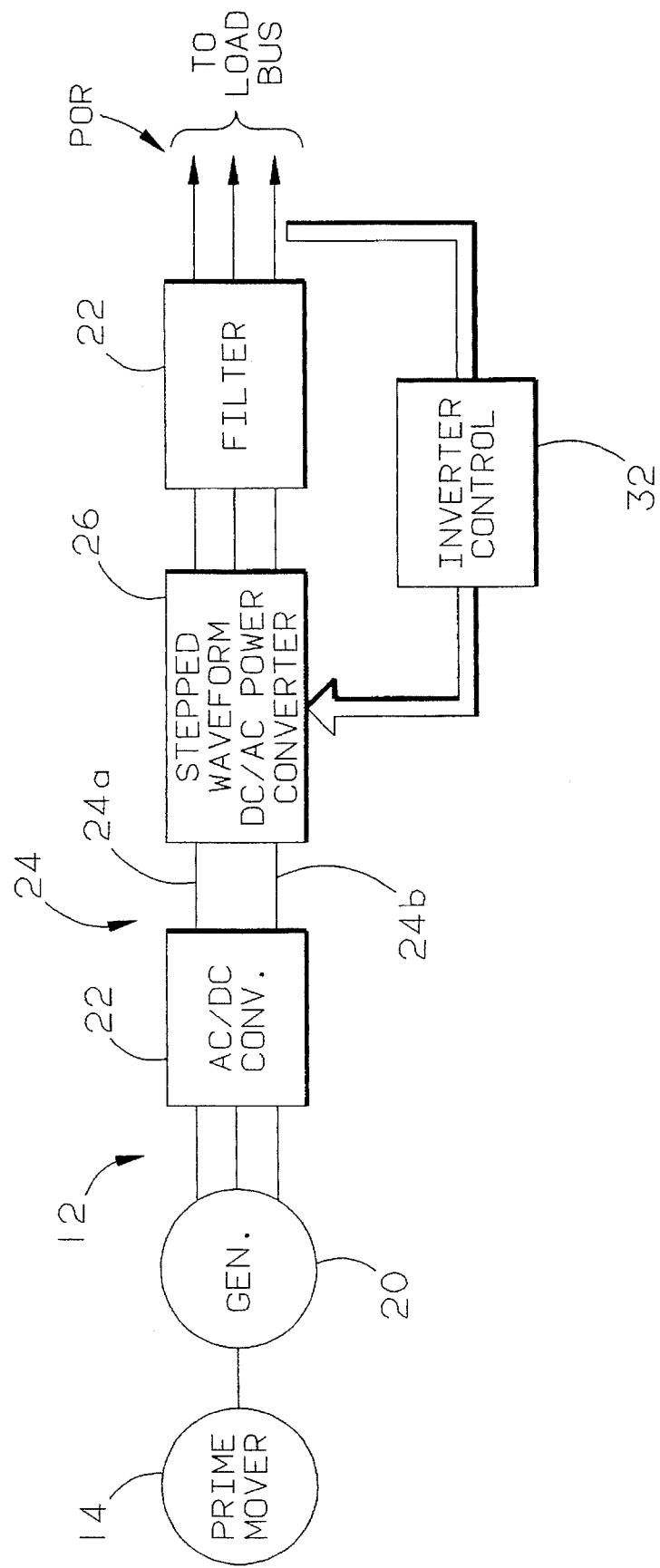
FIG. 2 is a block diagram of the VSCF system of FIG. 1 in conjunction with the prime mover.

Referring now to FIG. 2, the VSCF system 12 includes a brushless, synchronous generator 20 that converts the variable-speed motive power produced by the prime mover 14 into variable-frequency AC electrical power. An AC/DC converter 22 converts the variable-frequency power into DC power on a DC link 24 comprising first and second DC link conductors 24a, 24b, respectively. A stepped-waveform DC/AC power converter 26 according to the present invention converts the DC power on the DC link 24 into polyphase, constant-frequency AC electrical power which may be filtered by an optional filter 28 and provided to the load bus 16.

An inverter control 32 senses one or more operating parameters at a point of regulation (POR) at or near the load bus 16 and develops signals, described in greater detail hereinafter, which control switches in the inverter 26.

Figure 3:
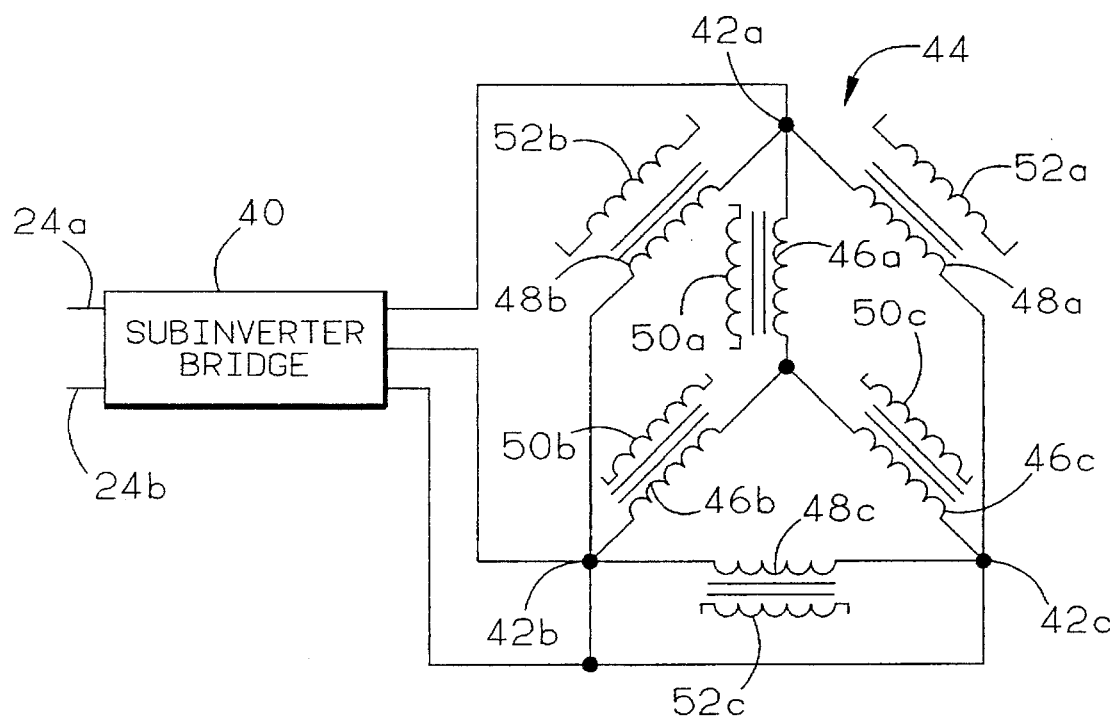
FIG. 3 is a combined schematic and block diagram of the stepped-waveform power converter of FIG. 2.

Referring now to FIG. 3, the stepped-waveform inverter 26 includes an inverter bridge 40 having three-phase outputs that are connected to junctions 42a, 42c of a summing transformer 44. The summing transformer 44 includes a first set of primary windings 46a–46c connected together in a phase-to-neutral or wye configuration and a second set of primary windings 48a–48c connected together in a phase-to-phase or delta configuration. Terminals of the windings 46a–46c are connected to terminals of the windings 48a–48c at the junctions 42a–42c. The windings 46a–46c and 48a–48c are thus connected in a wye-delta winding configuration.

The summing transformer 44 further includes a first set of secondary windings 50a–50c which are inductively coupled to the first set of primary windings 46a–46c, respectively, and a second set of secondary windings 52a–52c which are inductively coupled to the windings 48a–48c, respectively.

Figure 4:
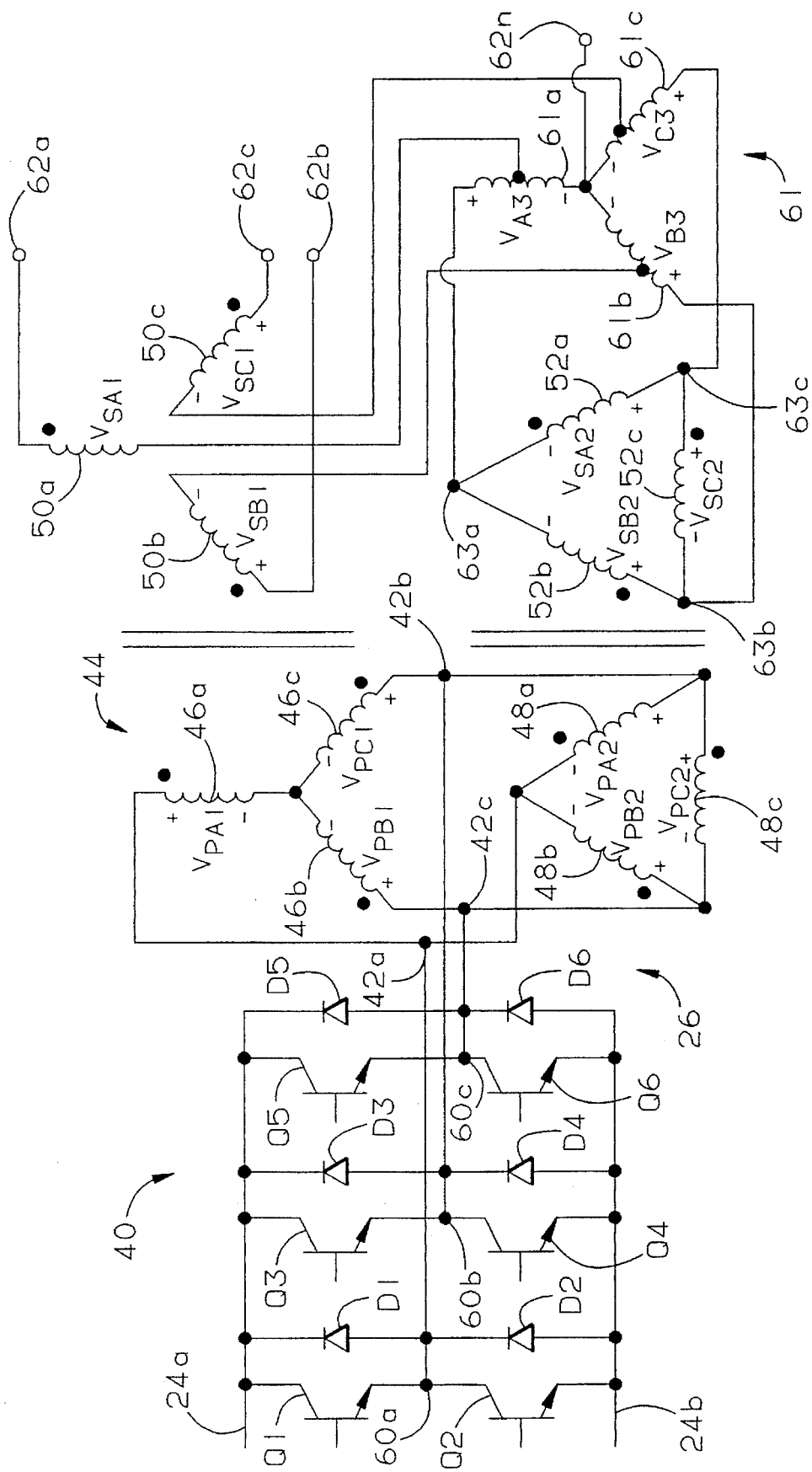
FIG. 4 is a simplified schematic diagram of the stepped-waveform power converter of FIG. 2.

FIG. 4 illustrates the inverter bridge 40 and the electrical interconnection of the windings of the summing transformer 44 in greater detail. The subinverter bridge 40 includes six power switches Q1–Q6 in the form of conventional bipolar or insulated gate bipolar transistors together with associated flyback diodes D1–D6, respectively. It should be noted that the power switches Q1–Q6 may be of a different type, if desired. The switches Q1–Q6 are connected together in pairs and junctions 60a, 60b and 60c between the switches of each pair comprise phase output terminals that are coupled to the junctions 42a–42c of the summing transformer 44. A neutral forming transformer (NFT) 61 is provided for interconnecting the first and second sets of secondary windings 50a–50c and 52a–52c. More particularly, the winding 50a is connected between a phase output terminal 62a and an intermediate or end tap of a phase winding 61a of the NFT 61. In like fashion, the windings 50b, 50c are connected between phase output terminals 62b, 62c and intermediate or end taps of the phase windings 61b, 61c of the NFT 61. The end taps of the phase windings 61a–61c are also coupled between junctions 63a–63c between the windings 52a–52c and a neutral terminal 62n.

Figure 5:
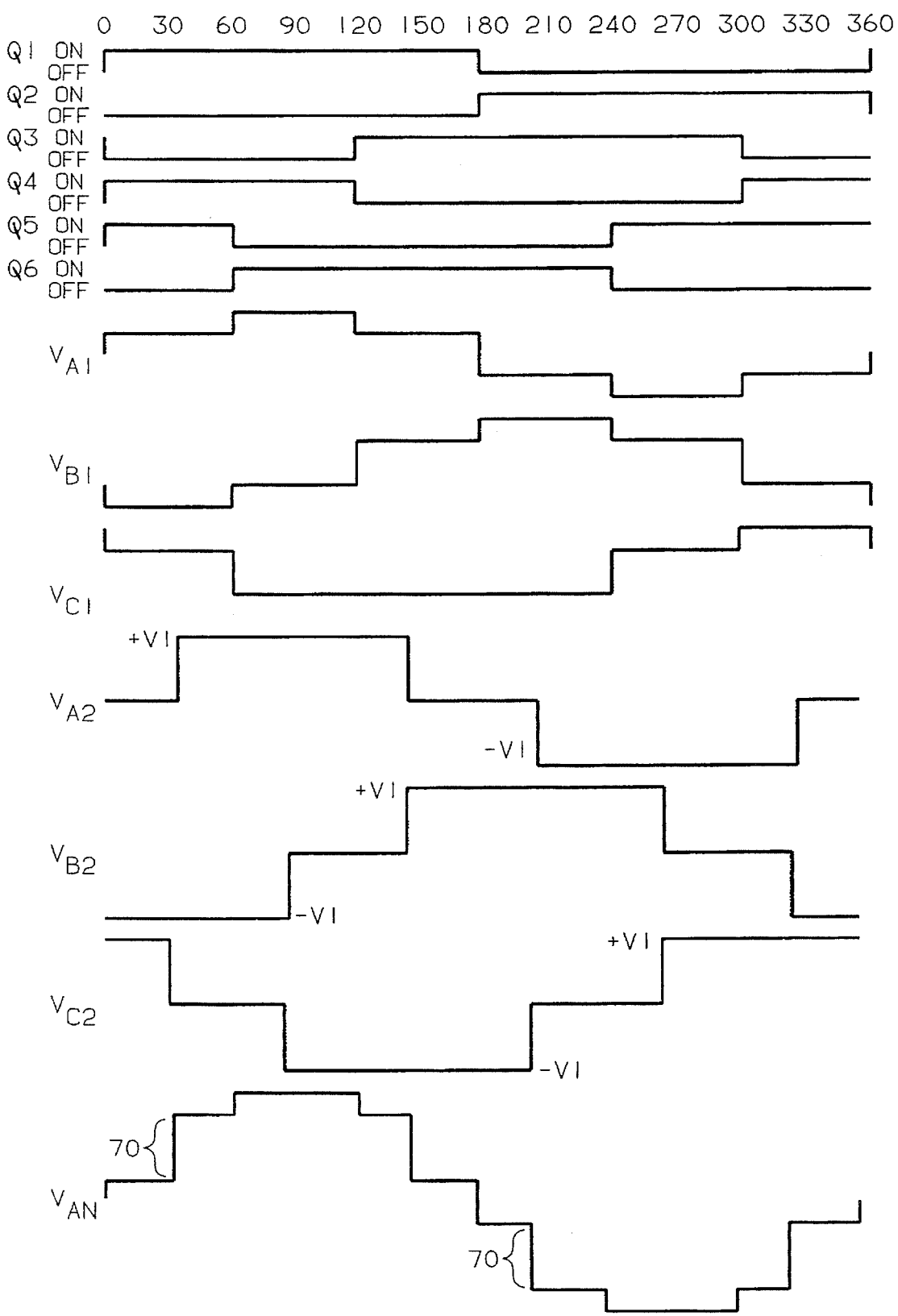
FIG. 5 is a series of waveform diagrams illustrating the operation of the stepped-waveform converter of FIG. 2.

FIG. 5 comprises a series of waveform diagrams illustrating the control of the switches Q1–Q6 by the inverter control 32, the voltages produced across windings of the summing transformer and the voltage across the summing transformer output terminals 62a and 62n.

As seen in the top six waveforms of FIG. 5, according to a first embodiment of the invention, the inverter control 32 produces control signals that cause each pair of switches Q1 and Q2, Q3 and Q4, and Q5 and Q6 to be continuously in a first state during a first half-cycle of the phase output produced thereby and to be continuously in a second state during a second half-cycle of the phase output produced thereby. That is, the switch Q1 is continuously turned on while the switch Q2 is off between zero degrees and 180 degrees and the switch Q2 is continuously turned on in the interval between 180 degrees and 360 degrees while the switch Q1 is off. Also, the switches Q3 and Q4 are controlled in identical fashion, except that the switching points are displaced 120 degrees with respect to the switching points for the switches Q1 and Q2. Also, the switches Q5 and Q6 are operated in identical fashion, except that the switching points are displaced 240 degrees with respect to the switching points for the switches Q1 and Q2. If necessary, a brief dwell interval may be interposed between turn off of one switch and turn on of the other switch of each pair to minimize the possibility of a shoot-through condition caused by simultaneous conduction of both switches of a pair.

The above-described switching pattern result in generation of three stepped inverter voltage waveforms across the windings 50a, 50b, 50c which are identical except that they are displaced 120 degrees relative to one another. For example, a rectangular voltage waveform $V_{SA1}$ is produced across the winding 50a which comprises a stepped-waveform having six steps of equal duration per cycle wherein each step assumes one of four voltage levels. This waveform is produced by a corresponding voltage $V_{PA1}$ developed across the winding 46a by the pair of power switches Q1 and Q2 which is in phase with the waveform $V_{SA1}$. Rectangular voltage waveforms $V_{B1}$ and $V_{C1}$ are produced across the windings 50b, 50c, respectively, which are identical to the waveform $V_{A1}$, except with the 120 degree phase relationship noted above. The voltage waveforms are produced by corresponding in-phase voltages developed across the windings 46b, 46c by the pairs of power switches Q3, Q4 and Q5, Q6.

A second set of rectangular voltage waveforms $V_{A3}$, $V_{B2}$, $V_{C3}$ are produced across the phase windings 61a–61c of the NFT 61. These waveforms are identical to one another, except that they are also phase shifted 120 degrees relative to one another, and include four steps of unequal duration per cycle wherein each step assumes one of three voltage levels, +V1, zero and –V1. The waveforms $V_{A2}$, $V_{B2}$, $V_{C2}$ are developed by corresponding voltages $V_{PA2}$, $V_{PB2}$, $V_{PC2}$ developed by the switch pairs Q1 and Q2, Q3 and Q4, Q5 and Q6 across the primary windings 48a–48c, which in turn induce voltages $V_{SA2}$, $V_{SB2}$, $V_{SC2}$ across the secondary windings 52a–52c. The NFT 61 causes the voltages $V_{A3}$-$V_{C3}$ to lag the voltages $V_{PA2}$-$V_{PC2}$ by 30° so that the fundamental components of the voltage waveforms $V_{SA1}$-$V_{SC1}$, and $V_{A3}$-$V_{C3}$ are in phase. The interconnection of the first and second sets of secondary windings 50a–50c and 52a–52c by the NFT 61 causes the corresponding phase voltage waveforms to be added. More particularly, the phase voltage waveform $V_{SA1}$ is summed with a scaled version of the phase voltage waveform $V_{A3}$ to produce a 12-step phase output voltage $V_{AN}$ across the terminals 62a, 62n. The point of connection of the winding 50a to the winding 61a determines the heights of portions 70 of the waveform $V_{AN}$. By adjusting this connection point, the harmonic content in the waveform $V_{AN}$ can be controlled.

In like fashion, 12-step phase output voltage waveforms $V_{BN}$ and $V_{CN}$ are produced across the terminals 62b, 62n and 62c, 62n, respectively, by summing the voltages $V_{SB1}$ and $V_{SC1}$ with scaled versions of the waveforms $V_{B3}$ and $V_{C3}$, respectively. The phase output waveforms are preferably identical to the waveform $V_{AN}$ except with the desired 120 degree and 240 degree displacement, respectively. Significantly, the phase output waveforms contain no even harmonics. Also, inasmuch as the neutral is derived directly from the phase output waveforms themselves, there are no triple harmonics.

In an alternative embodiment, harmonic content in the phase output waveforms may be reduced significantly by pulse-width modulating the inverter switches Q1–Q6 in the manner disclosed and claimed in Nguyen, et al., U.S. patent application Ser. No. 709,118, filed Jun. 3, 1991, entitled "Stepped Waveform Inverter Utilizing Pulse-Width Modulation" and assigned to the assignee of the instant application, the disclosure of which is incorporated by reference herein. In this embodiment, the control signals for the switches Q1–Q6 are like those shown in FIG. 5, except that each pair of switches is switched between a pair of states in a pulse-width modulated (PWM) fashion during each half cycle of the phase output produced thereby. In the first half cycle, the switch Q2 is kept continuously off while the switch Q1 is switched between on and off states according to a particular PWM pattern. In the second half-cycle, the switch Q1 is kept off while the switch Q2 is switched between on and off states according to the particular PWM pattern. In this embodiment, the switches Q3 and Q4 are operated in like fashion as are the switches Q5 and Q6, except with a phase displacement of 120° and 240°, respectively, relative to the operation of the switches Q1 and Q2. When five pulses per half-cycle are produced in each inverter phase output, it is possible to reduce total harmonic distortion (THD) to less than 4% when the leakage reactance of the summing transformer and a capacitor acting as a low pass filter having a corner frequency at approximately 5 kHz are used.

It can be seen that the inverter 26 produces a stepped-waveform output using only a single inverter bridge. Thus, complexity, expense and weight are minimized. Further, reliability and efficiency are improved and isolation between input and output is provided.

We claim:

1. A summing transformer, comprising:

first and second sets of primary windings each having a plurality of terminals wherein the windings of the first set of primary windings are connected in a phase-to-neutral configuration and the windings of the second set of primary windings are connected in a phase-to-phase configuration and wherein the terminals of the first set of primary windings are electrically connected to corresponding terminals of the second set of primary windings and to corresponding phase inputs;

first and second sets of secondary windings wherein each winding of the first set of secondary windings is inductively coupled to an associated winding of the first set of primary windings and each winding of the second set of secondary windings is inductively coupled to an associated winding of the second set of primary windings wherein the windings of the first set of secondary windings are coupled to phase outputs; and means for interconnecting the first and second sets of secondary windings.

2. A summing transformer, comprising:

first and second sets of primary windings each having a plurality of terminals wherein the windings of the first set of primary windings are connected in a phase-to-neutral configuration and the windings of the second set of primary windings are connected in a phase-to-phase configuration and wherein the terminals of the first set of primary windings are coupled to corresponding terminals of the second set of primary windings and to corresponding phase inputs;

first and second sets of secondary windings wherein each winding of the first set of secondary windings is inductively coupled to an associated winding of the first set of primary windings and each winding of the second set of secondary windings is inductively coupled to an associated winding of the second set of primary windings wherein the windings of the first set of secondary windings are coupled to phase outputs;

means for interconnecting the first and second sets of secondary windings; and wherein the interconnecting means comprises a neutral forming transformer having phase windings coupled between the first and second sets of secondary windings.

3. The summing transformer of claim 1, wherein each set of primary windings and each set of secondary windings includes three phase windings.

4. The summing transformer of claim 1, in combination with an inverter having phase outputs coupled to the phase inputs of the summing transformer.

5. The summing transformer of claim 4, wherein the inverter includes means for producing rectangular waveforms at the phase outputs thereof.

6. The summing transformer of claim 4, wherein the inverter includes means for producing pulse-width modulated waveforms at the phase outputs thereof.

7. A power converter, comprising:

an inverter bridge having a plurality of phase outputs;

a summing transformer having first and second sets of primary windings each having a plurality of terminals coupled to the inverter bridge wherein the windings of the first set of primary windings are connected in a phase-to-neutral configuration and the windings of the second set of primary windings are connected in a phase-to-phase configuration, the summing transformer further including first and second sets of secondary windings wherein each winding of the first set of secondary windings is inductively coupled to an associated winding of the first set of primary windings and each winding of the second set of primary windings is inductively coupled to an associated winding of the second set of primary windings and wherein each winding of the first set of secondary windings includes an end connected to a phase output;

a neutral forming transformer coupled to the windings of the first and second sets of secondary windings; and means for operating the inverter bridge such that a rectangular phase output waveform is produced at each phase output.

8. The power converter of claim 7, wherein the neutral forming transformer includes phase windings coupled between the windings of the second set of secondary windings and a neutral voltage.

9. The power converter of claim 8, wherein each winding of the first set of secondary windings is coupled to an intermediate tap of one of the phase windings of the neutral forming transformer.

10. A power converter, comprising:

a three-phase inverter bridge;

a summing transformer having first and second sets of three-phase primary windings, each set having three terminals coupled to the inverter bridge wherein the primary windings of the first set are connected in a wye configuration and the primary windings of the second set are connected in a delta configuration and wherein each terminal of the first set of primary windings is coupled to a corresponding terminal of the second set of secondary windings, the summing transformer further including first and second sets of three-phase secondary windings wherein each winding of the first set of secondary windings is inductively coupled to an associated winding of the first set of primary windings and each winding of the second set of primary windings is inductively coupled to an associated winding of the second set of primary windings and wherein each winding of the first set of secondary windings includes a first end coupled to a phase output;

a neutral forming transformer coupled to second ends of the windings of the first set of secondary windings and the windings of the second set of secondary windings; and means for operating the inverter bridge such that a stepped phase output waveform is produced at each phase output.

11. The power converter of claim 10, wherein the inverter bridge includes three pairs of power switches and wherein the operating means includes means for causing the power switches to produce three stepped inverter waveforms displaced 120 electrical degrees with respect to one another.

12. The power converter of claim 10, wherein the neutral forming transformer includes phase windings coupled between the windings of the second set of secondary windings and a neutral voltage.

13. The power converter of claim 11, wherein each winding of the first set of secondary windings is coupled to an intermediate tap of one of the phase windings of the neutral forming transformer.

14. The power converter of claim 10, wherein the inverter bridge includes three pairs of power switches wherein each pair of power switches develops an associated phase waveform and wherein the operating means includes means for causing each pair of power switches to be continuously in a first state during a first, half-cycle of the associated phase waveform and to be continuously in a second state during a second half-cycle of the associated phase waveform.

15. The power converter of claim 10, wherein the inverter bridge includes three pairs of power switches wherein each pair of power switches develops an associated phase waveform and wherein the operating means includes means for causing each pair of power-switches to switch between a first pair of states in a pulse-width modulated fashion during a first half-cycle of the associated phase waveform and to switch between a second pair of states in a pulse-width modulated fashion during a second half-cycle of the associated phase waveform.

\* \* \* \* \*